United States Patent
Deng et al.

(10) Patent No.: US 12,348,103 B1
(45) Date of Patent: Jul. 1, 2025

(54) LINEAR MOTOR FOR SMALL HOME APPLIANCES

(71) Applicant: KERUI TECHNOLOGY (DONGGUAN) CO., LTD, Guangdong (CN)

(72) Inventors: Min Deng, Guangdong (CN); Yongzhi Yuan, Guangdong (CN); Hongmin Wei, Guangdong (CN)

(73) Assignee: KERUI TECHNOLOGY (DONGGUAN) CO., LTD, Guangdong (CN)

( * ) Notice: Subject to any disclaimer, the term of this patent is extended or adjusted under 35 U.S.C. 154(b) by 0 days.

(21) Appl. No.: 19/081,100

(22) Filed: Mar. 17, 2025

(30) Foreign Application Priority Data

Nov. 28, 2024 (CN) .......................... 202411721468.X (51) Int. Cl.
*H02K 1/08* (2006.01)
*H02K 33/12* (2006.01)
*H02K 41/02* (2006.01)

(52) U.S. Cl.
CPC ............... *H02K 41/02* (2013.01); *H02K 1/08* (2013.01); *H02K 33/12* (2013.01)

(58) Field of Classification Search
CPC .......... H02K 41/02; H02K 1/08; H02K 33/00; H02K 33/02; H02K 33/16; H02K 35/00; H02K 35/02; H02K 35/04; H02K 35/06
USPC .................... 310/25, 15, 36, 29, 21
See application file for complete search history.

(56) References Cited

U.S. PATENT DOCUMENTS

| | | | | | |
|---|---|---|---|---|---|
| 4,346,318 | A | * | 8/1982 | Shtrikman | H02K 33/06 310/12.24 |
| 4,831,292 | A | * | 5/1989 | Berry | H02K 33/06 310/23 |
| 5,587,615 | A | * | 12/1996 | Murray | H02K 33/16 310/15 |
| 6,914,351 | B2 | * | 7/2005 | Chertok | H02K 35/02 310/12.26 |
| 7,633,189 | B2 | * | 12/2009 | Iwasa | H02K 41/03 310/15 |

(Continued)

FOREIGN PATENT DOCUMENTS

| CN | 114977718 A | 8/2022 |
|---|---|---|
| CN | 219643778 U | 9/2023 |

(Continued)

*Primary Examiner* — Maged M Almawri
(74) *Attorney, Agent, or Firm* — Rondaus PLLC; George Liu (57) ABSTRACT

Disclosed is a linear motor for small home appliances. The linear motor for small home appliances includes a casing and an iron core, where both upper and lower sides of an inner wall of the iron core are each provided with at least one salient pole, and the salient poles on the upper and lower sides are staggered from each other; a coil winding is wound on the salient pole, a guide seat is arranged at an inner bottom of the casing, a magnet support is slidably arranged in the casing, the magnet support is provided with a head portion at a position close to an open end of the casing, and a magnet assembly is slidably arranged in the magnet support; the magnet assembly is provided with at least one magnet; both upper and lower sides of the magnetic support are each provided with at least one window.

9 Claims, 8 Drawing Sheets

(56) References Cited

U.S. PATENT DOCUMENTS

| | | | | |
|---|---|---|---|---|
| 7,671,493 B2* | 3/2010 | Takashima | G06F 3/016 | 310/15 |
| 7,687,943 B2* | 3/2010 | Lunde | H02K 7/1846 | 310/58 |
| 8,278,786 B2* | 10/2012 | Woo | H02K 33/16 | 310/15 |
| 8,456,032 B2* | 6/2013 | Hochberg | F03B 13/00 | 290/43 |
| 8,648,502 B2* | 2/2014 | Park | H02K 33/16 | 310/15 |
| 8,704,387 B2* | 4/2014 | Lemieux | F03G 7/08 | 290/1 R |
| 8,941,251 B2* | 1/2015 | Zuo | H02K 35/02 | 290/1 R |
| 8,941,272 B2* | 1/2015 | Hong | H02K 33/18 | 310/15 |
| 9,024,489 B2* | 5/2015 | Akanuma | H02K 33/16 | 310/15 |
| 9,225,265 B2* | 12/2015 | Oh | G06F 3/016 | |
| 9,240,267 B2* | 1/2016 | Nagahara | H02K 35/02 | |
| 9,306,459 B2* | 4/2016 | Akanuma | H02K 33/16 | |
| 9,543,816 B2* | 1/2017 | Nakamura | H02K 33/16 | |
| 9,748,827 B2* | 8/2017 | Dong | H02K 33/16 | |
| 9,948,170 B2* | 4/2018 | Jun | H02K 33/00 | |
| 10,008,894 B2* | 6/2018 | Mao | H02K 1/34 | |
| 10,033,257 B2* | 7/2018 | Zhang | H02K 33/12 | |
| 10,063,128 B2* | 8/2018 | Wang | H02K 33/16 | |
| 10,103,614 B2* | 10/2018 | Guo | H02K 33/18 | |
| 10,160,010 B2* | 12/2018 | Chun | H02K 33/16 | |
| 10,307,791 B2* | 6/2019 | Xu | B06B 1/045 | |
| 10,328,461 B2* | 6/2019 | Xu | B06B 1/045 | |
| 10,404,150 B2* | 9/2019 | Swanson | H02K 35/06 | |
| 10,483,451 B2* | 11/2019 | Wang | H10N 30/01 | |
| 10,486,196 B2* | 11/2019 | Chai | B06B 1/045 | |
| 10,491,090 B2* | 11/2019 | Zu | H02K 33/16 | |
| 10,547,233 B2* | 1/2020 | Jin | H02K 5/04 | |
| 10,581,309 B2* | 3/2020 | Da Conceição Rosa | F16F 15/03 | |
| 10,581,355 B1* | 3/2020 | Dyson | H02P 6/005 | |
| 10,596,596 B2* | 3/2020 | Ling | H04R 9/066 | |
| 10,674,278 B2* | 6/2020 | Zhou | H04R 9/025 | |
| 10,763,732 B2* | 9/2020 | Liu | H02K 33/18 | |
| 10,886,827 B2* | 1/2021 | Liu | H02K 33/14 | |
| 10,930,838 B1* | 2/2021 | Miesner | H02N 2/043 | |
| 10,931,188 B2* | 2/2021 | Garcia-Herreros | H02K 15/03 | |
| 10,998,487 B1* | 5/2021 | Miesner | H10N 35/80 | |
| 11,050,334 B2* | 6/2021 | Mori | H02K 33/16 | |
| 11,522,429 B2* | 12/2022 | Takahashi | H02K 33/16 | |
| 11,569,723 B2* | 1/2023 | Ma | H02K 33/18 | |
| 11,716,003 B1* | 8/2023 | Miesner | H02K 33/16 | 310/27 |
| 11,831,215 B2* | 11/2023 | Li | H02K 33/10 | |
| 11,863,039 B2* | 1/2024 | Takahashi | H02K 33/16 | |
| 12,015,318 B1 | 6/2024 | Wang | H02K 11/0094 | |
| 2003/0127916 A1* | 7/2003 | Godkin | H02K 41/0356 | 310/12.16 |
| 2006/0044093 A1* | 3/2006 | Ohta | H02K 99/20 | 335/220 |
| 2006/0219496 A1* | 10/2006 | Dimig | H01F 7/08 | 188/161 |
| 2008/0174187 A1* | 7/2008 | Erixon | H02K 33/16 | 310/15 |
| 2008/0315595 A1* | 12/2008 | Bataille | H02K 35/02 | 290/1 R |
| 2009/0267423 A1* | 10/2009 | Kajiwara | H02K 33/02 | 310/38 |
| 2010/0176664 A1* | 7/2010 | Roberts | H02K 35/02 | 310/25 |
| 2010/0213773 A1* | 8/2010 | Dong | H02K 33/16 | 310/25 |
| 2011/0018364 A1* | 1/2011 | Kim | H02K 33/18 | 310/20 |
| 2011/0068640 A1* | 3/2011 | Choi | H02K 5/04 | 310/25 |
| 2011/0089772 A1* | 4/2011 | Dong | H02K 33/16 | 310/25 |
| 2011/0115311 A1* | 5/2011 | Dong | H02K 33/16 | 310/28 |
| 2011/0133577 A1* | 6/2011 | Lee | H02K 33/18 | 310/15 |
| 2012/0013202 A1* | 1/2012 | Lee | H02K 41/0356 | 310/12.16 |
| 2012/0153748 A1* | 6/2012 | Wauke | H02K 33/16 | 310/25 |
| 2012/0187780 A1* | 7/2012 | Bang | H02K 33/16 | 310/25 |
| 2012/0242086 A1* | 9/2012 | Yang | H02K 35/02 | 290/50 |
| 2012/0242175 A1* | 9/2012 | Yang | H02K 35/02 | 310/30 |
| 2012/0313459 A1* | 12/2012 | Zhang | H02K 33/18 | 310/25 |
| 2013/0093266 A1* | 4/2013 | Hong | H02K 33/18 | 29/446 |
| 2013/0099600 A1* | 4/2013 | Park | B06B 1/045 | 310/15 |
| 2013/0193779 A1* | 8/2013 | Kuroda | H02K 33/12 | 310/15 |
| 2013/0342034 A1* | 12/2013 | Moon | B06B 1/045 | 310/25 |
| 2013/0342035 A1* | 12/2013 | Kim | H02K 33/00 | 310/25 |
| 2014/0042832 A1* | 2/2014 | Wang | H02K 3/28 | 310/12.21 |
| 2014/0054983 A1* | 2/2014 | Moon | H02K 33/16 | 310/28 |
| 2014/0062224 A1* | 3/2014 | Kim | H02K 33/16 | 310/15 |
| 2014/0202252 A1* | 7/2014 | Umehara | H02K 1/34 | 73/664 |
| 2015/0108854 A1* | 4/2015 | Akasaka | H02K 33/18 | 310/25 |
| 2015/0137627 A1* | 5/2015 | Katada | H02K 33/16 | 310/25 |
| 2016/0173990 A1* | 6/2016 | Park | H04R 9/043 | 381/354 |
| 2017/0033657 A1* | 2/2017 | Mao | H02K 33/16 | |
| 2017/0033662 A1* | 2/2017 | Wang | H02K 33/02 | |
| 2017/0110920 A1* | 4/2017 | Mao | H02K 1/34 | |
| 2017/0117788 A1* | 4/2017 | Hou | H02K 1/34 | |
| 2017/0214306 A1* | 7/2017 | Katada | H02K 33/16 | |
| 2017/0288519 A1* | 10/2017 | Kim | H02K 33/16 | |
| 2017/0310203 A1* | 10/2017 | Takeda | H02K 33/16 | |
| 2018/0021812 A1* | 1/2018 | Akanuma | H02K 33/00 | 310/25 |
| 2018/0115231 A1* | 4/2018 | Xu | H02K 1/34 | |
| 2018/0124296 A1* | 5/2018 | Mak | H04N 23/685 | |
| 2018/0216504 A1* | 8/2018 | De Mar | H02K 41/031 | |
| 2018/0219465 A1* | 8/2018 | Katada | B06B 1/045 | |
| 2018/0335601 A1* | 11/2018 | Hu | G03B 5/00 | |
| 2019/0052160 A1* | 2/2019 | Oi | H02K 33/02 | |
| 2019/0070635 A1* | 3/2019 | Takeda | H02K 33/18 | |
| 2019/0115817 A1* | 4/2019 | Monaghan | H02K 41/033 | |
| 2019/0165662 A1* | 5/2019 | Endo | B06B 1/045 | |
| 2019/0238039 A1* | 8/2019 | Tsuchihashi | B06B 1/04 | |
| 2019/0348897 A1* | 11/2019 | Garcia-Herreros | F16B 37/122 | |
| 2020/0099284 A1* | 3/2020 | Bischoff | H02K 11/014 | |
| 2020/0195106 A1* | 6/2020 | Szczukiewicz | H02K 15/061 | |
| 2020/0412221 A1* | 12/2020 | Yan | H02K 33/16 | |
| 2020/0412226 A1* | 12/2020 | Ma | H02K 33/16 | |
| 2021/0149491 A1* | 5/2021 | Takahashi | G06F 3/044 | |
| 2022/0247293 A1* | 8/2022 | Kuroda | H02K 5/24 | |
| 2022/0255412 A1* | 8/2022 | Wang | H02K 33/16 | |
| 2022/0360156 A1* | 11/2022 | Li | H02K 33/10 | |
| 2023/0101894 A1* | 3/2023 | Takahashi | B06B 1/045 | 310/81 |

(56) References Cited

U.S. PATENT DOCUMENTS

FOREIGN PATENT DOCUMENTS

| CN | 116979781 A | 10/2023 |
| JP | 2014132813 A | 7/2014 |

* cited by examiner

LINEAR MOTOR FOR SMALL HOME APPLIANCES

CROSS-REFERENCE TO RELATED APPLICATIONS

This application claims priority to Chinese Patent Application No. 202411721468.X, filed on Nov. 28, 2024, which is incorporated herein by reference in its entirety.

TECHNICAL FIELD

The present disclosure relates to the technical field of motors, and in particular, to a linear motor for small home appliances.

BACKGROUND

Most of the linear motors for small home appliances are permanent magnet synchronous motors because of size and cost factors. Due to the attraction force of the magnets to the stator iron core, there is a cogging torque, which makes the output torque provided by the linear motor have the same periodic fluctuation as the number of magnetic pole pairs during the operation of the linear motor. This periodic fluctuation makes the rotor of the linear motor unable to provide a sufficiently linear and smooth output torque, consequently reducing the experience of using the motor.

SUMMARY

The present disclosure aims to overcome the above defects and provides a linear motor for small home appliances, which can weaken the effect of a cogging torque on an output torque of the linear motor, thereby improving output smoothness of the linear motor, reducing production costs and decreasing motion inertia of a whole movable portion.

In order to achieve the above purposes, the specific solution of the present disclosure is as follows.

A linear motor for small home appliances, including a casing and an iron core, where the iron core is arranged in the casing, both upper and lower sides of an inner wall of the iron core are each provided with at least one salient pole, and the salient poles on the upper and lower sides are staggered from each other; a coil winding is wound on the salient pole, a guide seat is arranged at an inner bottom of the casing, a magnet support is slidably arranged in the casing, the magnet support is provided with a head portion at a position close to an open end of the casing, and a magnet assembly is slidably arranged in the magnet support; the magnet assembly is provided with at least one magnet; both upper and lower sides of the magnetic support are each provided with at least one window; and a position of the window corresponds to that of the salient pole.

The guide seat is provided with a switching groove, the magnet assembly is provided with a bayonet lock, the bayonet lock is movably embedded in the switching groove so that when the coil winding is electrified and generates a magnetic field same as that of the magnet, the magnet support drives the magnet assembly and the head portion to slide left and right, and at the same time, the magnet assembly slides up and down with respect to the magnet support, to cause the magnet to be embedded in the corresponding window.

Optionally, both the upper and lower sides of the inner wall of the iron core are each provided with two of the salient poles spaced apart; the magnet assembly is provided with two of the magnets; and both the upper and lower sides of the magnet support are each provided with two of the windows.

Optionally, the switching groove includes a first section, a second section, a third section, and a fourth section connected end to end in sequence; a first step is arranged between the first section and the second section, a second step is arranged between the second section and the third section, and a third step is arranged between the third section and the fourth section; bottom surfaces of the first section, the second section and the fourth section are all inclined surfaces, a depth of an end of the first section close to the fourth section is greater than a depth of an end of the first section close to the second section, a depth of an end of the second section close to the first section is less than a depth of an end of the second section close to the third section, and a depth of an end of the fourth section close to the third section is less than a depth of an end of the fourth section close to the first section; a beveled surface in smooth transition is arranged in the third section; the first section and the third section are both straight slots, and the first section and the third section are parallel to each other; and the second section and the fourth section are both curved slots.

The bayonet lock is elastically arranged on the magnet assembly.

Optionally, the magnet assembly includes a magnet slider, two of the magnets are arranged on left and right sides of the magnet slider, the magnet slider is provided with an accommodation hole in a side close to the guide seat, a spring is arranged in the accommodation hole, and the bayonet lock is slidably inserted into the accommodation hole and connected to the spring.

Optionally, the magnet support is provided with a guide plate on a side close to the guide seat, the guide plate is provided with an avoidance hole at a position corresponding to the bayonet lock, the guide plate is provided with first guide grooves in both sides of the avoidance hole, and the first guide groove has a contour shape identical to a contour shape of the second section or the fourth section.

The magnet slider is provided with first guide posts on both sides of the bayonet lock, and the first guide posts are movably embedded in the first guide grooves.

Optionally, the guide plate is provided with second guide posts at both ends; the guide seat is provided with second guide grooves at both ends; and the second guide posts are movably embedded in the second guide grooves.

Optionally, an inner wall of the magnet support is provided with two third guide grooves spaced apart, and the third guide groove has a contour shape identical to the contour shape of the second section or the fourth section; the magnet slider is provided with two third guide posts spaced apart on a side close to the open end of the casing; and the third guide posts are movably embedded in the third guide grooves.

Optionally, both end portions of the iron core are each provided with a winding support.

Optionally, the casing is provided with a guide bar at the open end, and the head portion is slidably arranged on an outer wall of the guide bar.

Optionally, the head portion is slidably arranged on guide bar through a linear bearing in a sleeving mode.

The present disclosure has the beneficial effects that in the present disclosure, by arranging the magnet to be in a movable state and utilizing the bayonet lock to be matched with the switching groove, the magnet is made to switch between the windows on both the upper and lower sides of the magnet support, so that a spacing between the magnet and the salient pole corresponding to the non-electrified coil winding increases during operation of the linear motor, thereby weakening the effect of a cogging torque on an output torque of the linear motor, and improving output smoothness of the linear motor. At the same time, the magnet moves up and down to have effect with the salient poles on the upper and lower sides, so that a number of the magnets required by the linear motor is only half of a number of the salient poles, which significantly lowers the production costs, and at the same time, reduces weight of the magnet assembly, thereby decreasing motion inertia of a whole movable portion.

List of Reference Numerals: 11, casing; 11a, open end; 12, iron core; 121, salient pole; 13, coil winding; 14, guide seat; 14a, switching groove; 141, first section; 142, second section; 143, third section; 144, fourth section; 145, first step; 146, second step; 147, third step; 148, bevel surface in smooth transition; 149, second guide groove; 15, winding support; 16, guide bar; 21, magnet support; 211, window; 212, third guide groove; 22, head portion; 23, magnet assembly; 231, magnet; 232, bayonet lock; 233, magnet slider; 2331, accommodating hole; 2332, first guide post; 2333, third guide post; 234, spring; 24, guide plate; 241, avoidance hole; 242, first guide groove; 243, second guide post; and 25: linear bearing.

DETAILED DESCRIPTION OF THE EMBODIMENTS

The present disclosure is further described in detail below in conjunction with the accompanying drawings and specific embodiments. But the implementation scope of the present disclosure is not limited thereto.

As shown in FIG. 1 to FIG. 12, a linear motor for small home appliances described in this embodiment includes a casing 11, and the casing 11 includes a shell and a bottom cover fixedly mounted at a rear end of the shell, such that a front end of the shell is an open end 11a. The casing and the bottom cover are enclosed to form a mounting space.

An iron core 12 arranged in the mounting space of the casing 11 is further included, both upper and lower sides inside the iron core 12 are each provided with at least one salient pole 121, and the salient poles 121 on both the upper and lower sides are staggered from each other. Preferably, projections of the salient poles 121 on the upper and lower sides partially overlap in a center cross section of the iron core 12; a coil winding 13 is wound on each salient pole 121, a guide seat 14 is arranged at an inner bottom of the casing 11, a magnet support 21 is slidably arranged in the casing 11, the magnet support 21 is provided with a head portion 22 at a position close to the open end 11a of the casing 11, and a magnet assembly 23 is slidably arranged in the magnet support 21; the magnet assembly 23 is provided with at least one magnet 231; both upper and lower sides of the magnetic support 21 are each provided with at least one window 211; and a position of each window 211 corresponds to that of the corresponding salient pole 121.

The guide seat 14 is provided with a switching groove 14a, the magnet assembly 23 is provided with a bayonet lock 232, the bayonet lock 232 is movably embedded in the switching groove 14a so that when the coil winding 13 is electrified and generates a magnetic field same as that of the magnet 231, the magnet support 21 drives the magnet assembly and the head portion 22 to slide left and right, and at the same time, the magnet assembly 23 slides up and down with respect to the magnet support 21, to cause the magnet 231 to be embedded in the corresponding window 211.

The casing 11, the iron core 12, the coil winding 13, and the guide seat 14 form a fixed portion; and the magnet support 21, the head portion 22, and the magnet assembly 23 form a movable portion.

Figure 6:
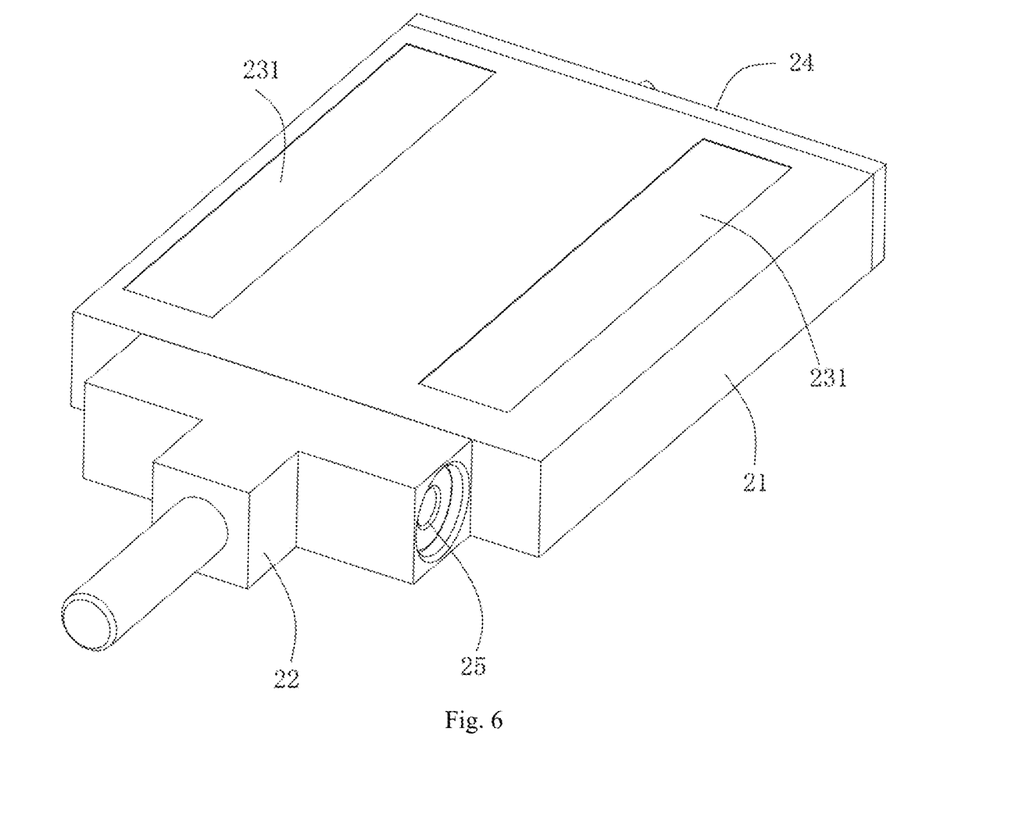
FIG. 6 is a three-dimensional view of a movable portion of the present disclosure when a magnet is embedded in an upper side window.

Specifically, the linear motor of this embodiment, as shown in FIG. 6, may be set such that at the initial time, the bayonet lock 232 is matched with the switching groove 14a so that the magnet assembly 23 is located on an upper side, and the magnet 231 of the magnet assembly 23 is embedded in the window 211 on the upper side, and an upper side of the magnet 231 is opposite to a position of the salient pole 121 located on the upper side.

Figure 8:
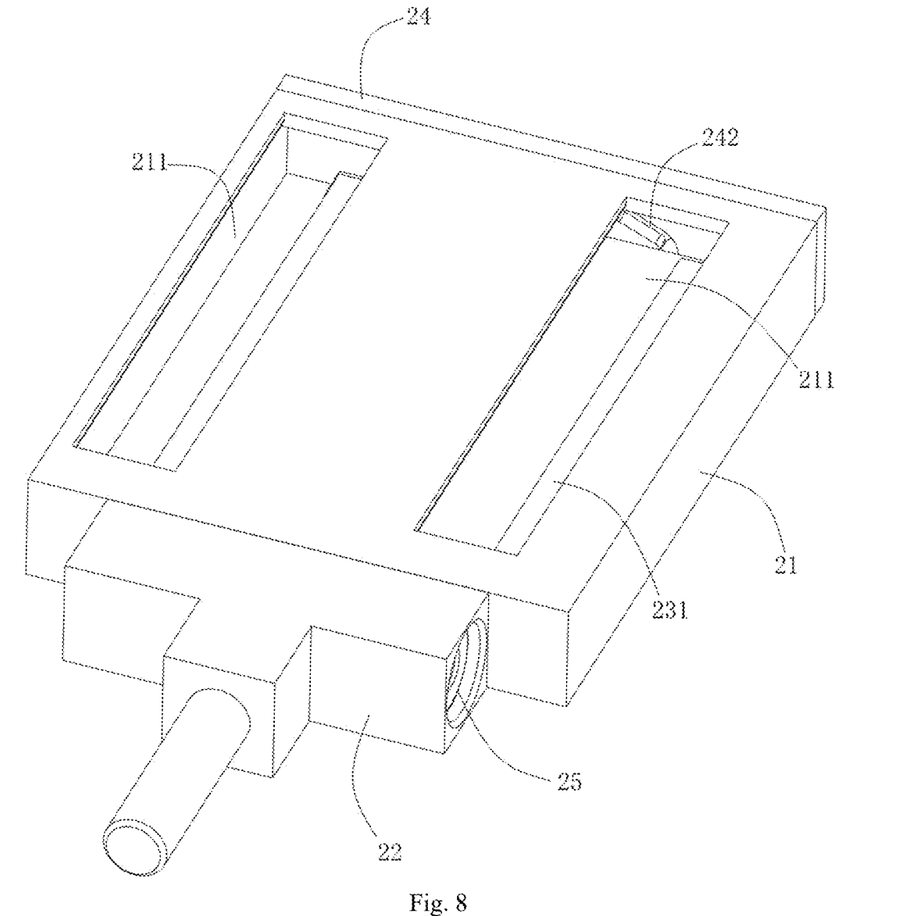
FIG. 8 is a three-dimensional view of the movable portion of the present disclosure when the magnet is embedded in a lower side window.
Figure 9:
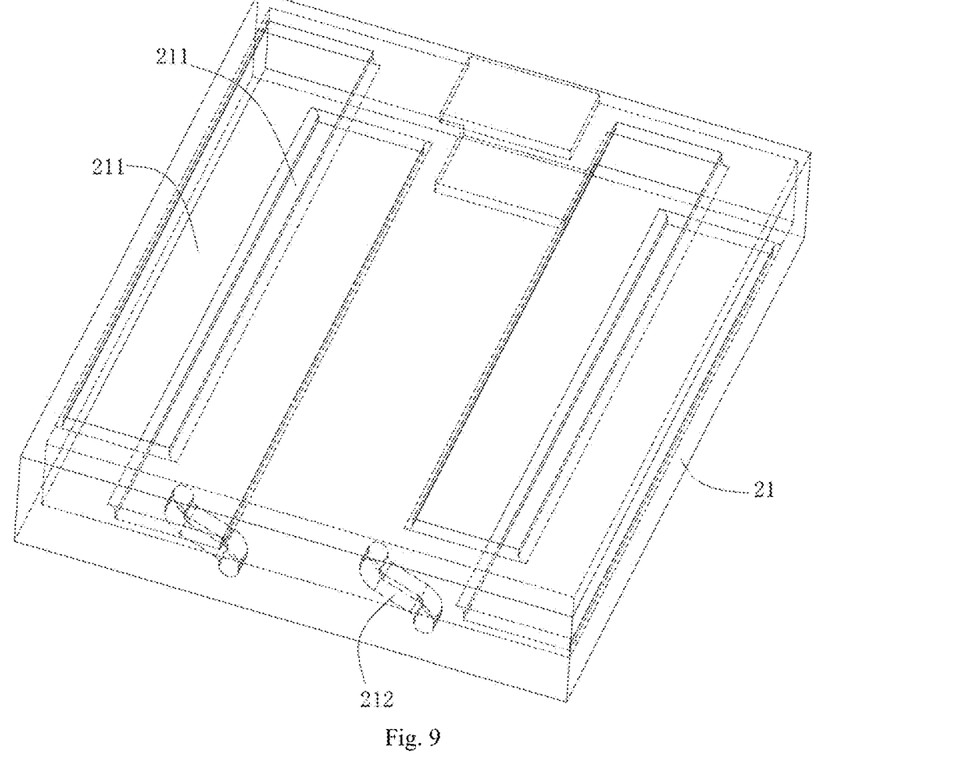
FIG. 9 is a structural schematic view of a magnet support of the present disclosure.

When the coil winding 13 located on the upper side is electrified and generates a magnetic field same as that of a magnetic pole on the upper side of the magnet 231, the magnet assembly 23 slides downwards under an acting force of the magnetic field, and at this time since the switching groove 14a is matched with the bayonet lock 232, the magnet support 21 slides towards the left and drives the head portion 22 to move towards the left. At the same time, the magnet assembly 23 drives the magnet 231 to move downwards with respect to the magnet support 21, so that the magnet 231 is disengaged from an interior of the window 211 located on the upper side until the magnet 231 on the magnet assembly 23 is embedded in the window 211 located on the lower side. As shown in FIG. 8, as a result, a lower side of the magnet 231 is opposite to a position of the salient pole 121 on the lower side, so that a spacing between the magnet 231 and the salient pole 121 corresponding to the non-electrified coil winding 13 located on the upper side is increased, thereby completing state switching of the magnet assembly 23.

Figure 7:
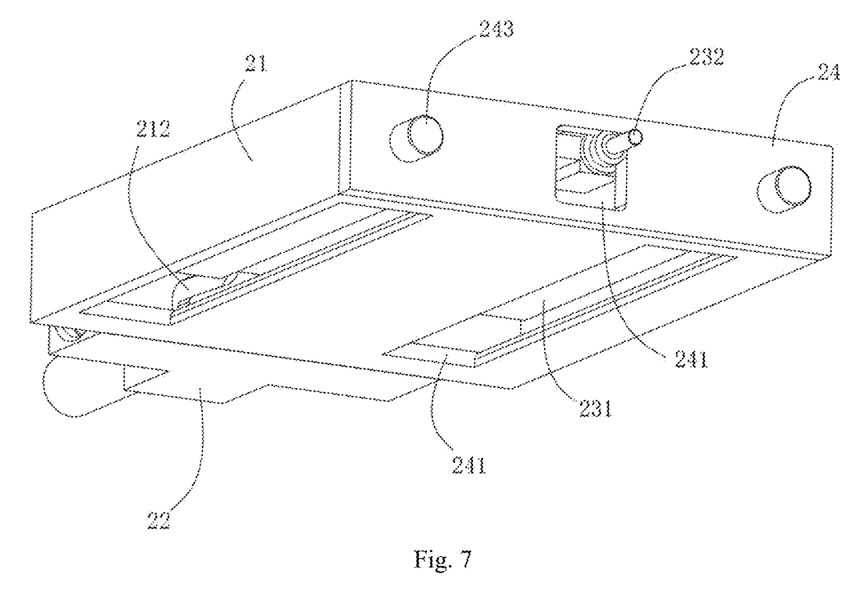
FIG. 7 is a three-dimensional view of the movable portion of the present disclosure when the magnet is embedded in the upper side window at another viewing angle.

After completing the state switching, the coil winding 13 located on the lower side is electrified and generates a magnetic field same as that of a magnetic pole on the lower side of the magnet 231, which pushes the magnet assembly 23 to slide upwards, and at this time the magnet support 21 drives the head portion 22 to move towards the right, while the magnet support 21 opposite to the magnet 231 of the magnet assembly 23 moves upwards until the magnet 231 of the magnet assembly 23 is embedded in the window 211 located on the upper side. As shown in FIG. 6 and FIG. 7, as a result, the upper side of the magnet 231 is caused to be opposite to the position of the salient pole 121 located on the upper side, so that returning to an initial position is achieved, and a spacing between the magnet 231 and the salient pole 121 corresponding to the non-electrified coil winding 13 located on the lower side is increased. Then a cycle of reciprocating motion is completed.

In this embodiment, by arranging the magnet 231 to be in a movable state and utilizing the bayonet lock 232 to be matched with the switching groove 14a, the magnet 231 is made to switch between the windows 211 on the upper and lower sides of the magnet support 21, so that the spacing between the magnet 231 and the salient pole 121 corresponding to the non-electrified coil winding 13 increases during operation of the linear motor, thereby weakening the effect of a cogging torque on an output torque of the linear motor, and improving output smoothness of the linear motor. At the same time, the magnet 231 moves up and down to have effect with the salient poles 121 on the upper and lower sides, so that a number of the magnets 231 required by the linear motor is only half of a number of the salient poles 121, which significantly reduces production costs, and at the same time, reduces weight of the magnet assembly, thereby decreasing motion inertia of the whole movable portion.

As shown in FIG. 3, FIG. 4 and FIG. 6 to FIG. 11, according to a linear motor for small home appliances as described in this embodiment, specifically, both the upper and lower sides of the inner wall of the iron core 12 are each provided with two salient poles 121 spaced apart; the magnet assembly 23 is provided with two magnets 231; and both the upper and lower sides of the magnetic support 21 are each provided with two windows 211. Due to such arrangements, the movable portion can reliably move in the casing 11 so as to achieve state switching of the magnet 231.

Figure 3:
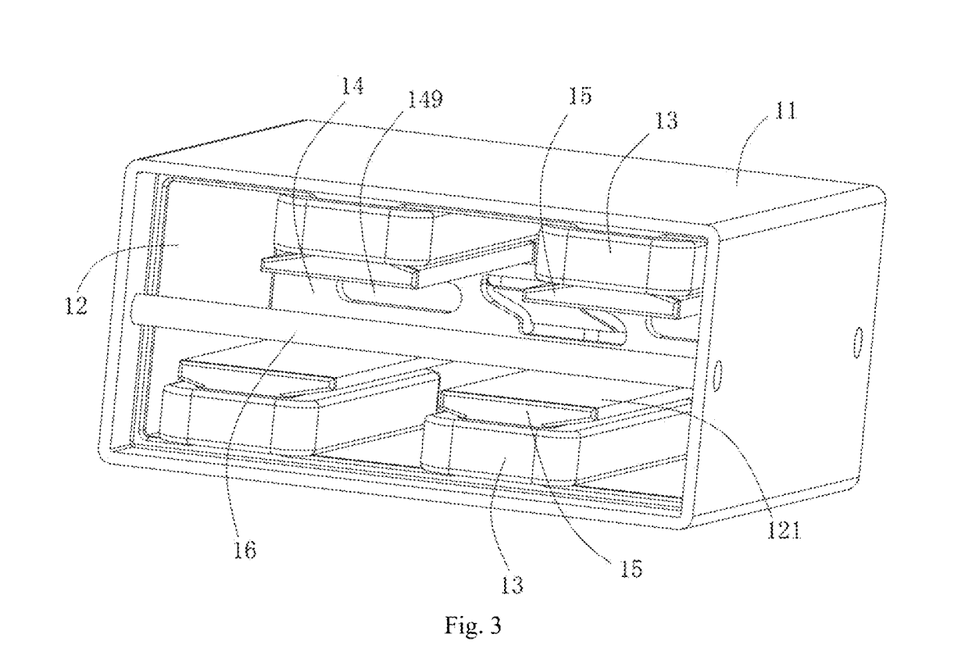
FIG. 3 is a three-dimensional view of a fixed portion of the present disclosure.
Figure 4:
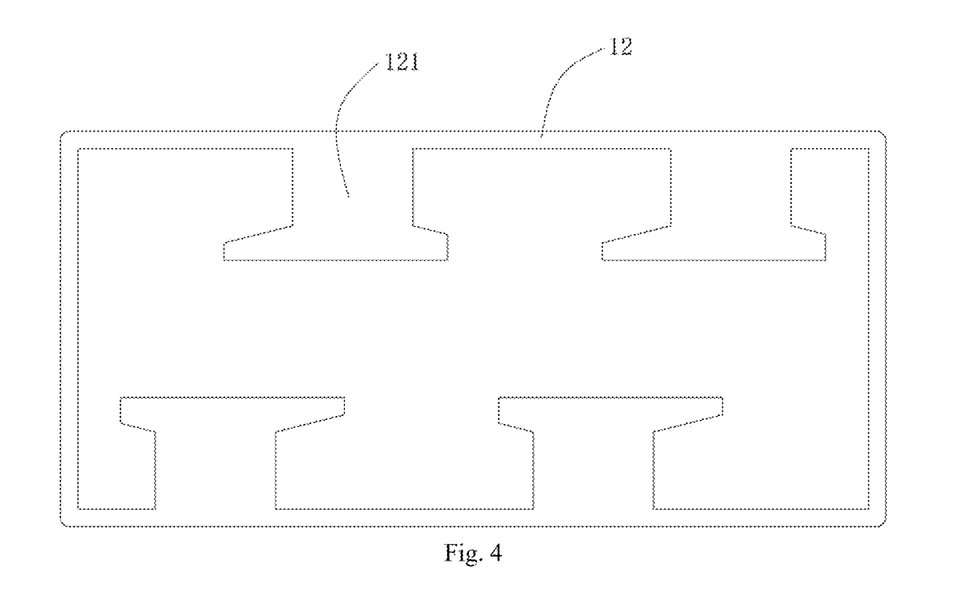
FIG. 4 is a front view of an iron core of the present disclosure.
Figure 5:
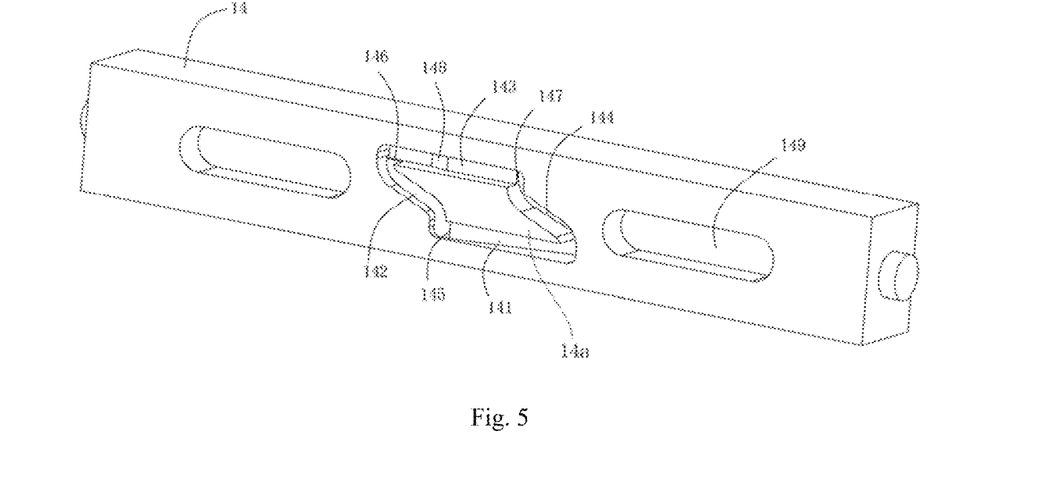
FIG. 5 is a three-dimensional view of a guide seat of the present disclosure.

As shown in FIG. 3 and FIG. 5, according to a linear motor for small home appliances as described in this embodiment, in some embodiments, the switching groove 14a includes a first section 141, a second section 142, a third section, 143 and a fourth section 144 connected end to end in sequence; a first step 145 is arranged between the first section 141 and the second section 142, a second step 146 is arranged between the second section 142 and the third section 143, and a third step 147 is arranged between the third section 143 and the fourth section 144; bottom surfaces of the first section 141, the second section 142 and the fourth section 144 are all inclined surfaces, a depth of an end of the first section 141 close to the fourth section 144 is greater than a depth of an end of the first section 141 close to the second section 142, a depth of an end of the second section 142 close to the first section 141 is less than a depth of an end of the second section 142 close to the third section 143, and a depth of an end of the fourth section 144 close to the third section 143 is less than a depth of an end of the fourth section 144 close to the first section 141; a beveled surface 148 in smooth transition is arranged in third section 143; the first section 141 and the third section 143 are both straight slots, and the first section 141 and the third section 143 are parallel to each other; the second section 142 and the fourth section 144 are both curved slots; and the bayonet lock 232 is elastically arranged on the magnet assembly 23.

Specifically, at the initial time, the bayonet lock 232 is located at the end of the first section 141 close to the fourth section 144, the magnet 231 is embedded in the window 211 located on the upper side and corresponds to the position of the salient pole 121 located on the upper side; when the coil winding 13 located on the upper side is energized and generates the magnetic field same as that of the magnetic pole on the upper side of the magnet 231, the movable portion is moved towards the left under the acting force of the magnetic field, and the bayonet lock 232 moves along a trajectory of the first section 141 until the bayonet lock 232 crosses the first step 145 and enters the second section 142; the first step 145 stops the bayonet lock 232 from returning to the first section 141; the bayonet lock 232 moves along a trajectory of the second section 142; and at this time, since the bayonet lock 232 and the second section 142 are matched, the magnet assembly 23 moves relative to the magnet support 21, and until the bayonet lock 232 crosses the second step 146 and enters the third section 143, the magnet 231 of the magnet assembly 23 is embedded in the window 211 located on the lower side. When the coil winding 13 located on the lower side is energized and generates the magnetic field same as that of the magnetic pole on the lower side of the magnet 231, the movable portion is moved towards the right under the acting force of the magnetic field, and the bayonet lock 232 moves along a trajectory of the third section 143; the bayonet lock 232 crosses the third step 147 and enters the fourth section 144; as the movable portion moves towards the right, the bayonet lock 232 moves along a trajectory of the fourth section 144; and at this time, since the bayonet lock 232 is matched with the fourth section 144, the magnet assembly 23 moves relative to the magnet support 21 until the bayonet lock 232 returns to an initial position, namely, the bayonet lock 232 is located at a junction of the fourth section 144 and the first section 141. Then a cycle of reciprocating motion is completed.

In this way, the magnet 231 can be switched between the windows 211 on the upper and lower sides; on the one hand, the magnet 231 is made to be farther away from the salient pole 121 in an idle state on the opposite side during a working process of the linear motor, so that an attraction force of the magnet 231 to the salient pole 121 in the idle state is reduced, thereby weakening a negative effect of the cogging torque on output smoothness. On the other hand, compared with existing linear motors that require magnets 231 with a number greater than a number of salient poles 121 of an iron core 12, the number of the magnets 231 required in this embodiment is only half of the number of the salient poles 121 of the iron core 12, which significantly reduces the production costs, and at the same time reduces the weight of the movable portion and decreases the motion inertia of the movable portion.

Figure 10:
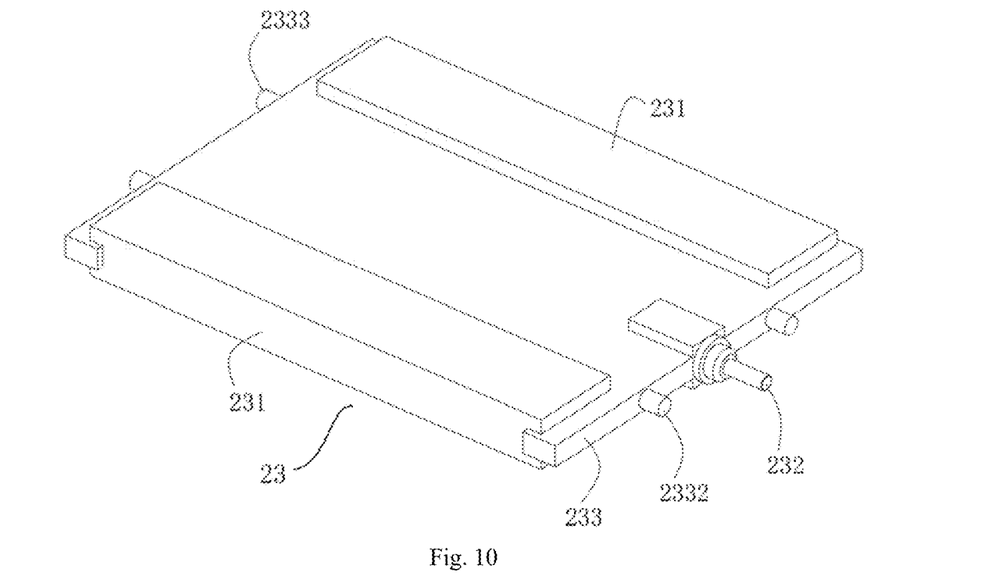
FIG. 10 is a three-dimensional view of a magnet assembly of the present disclosure.
Figure 11:
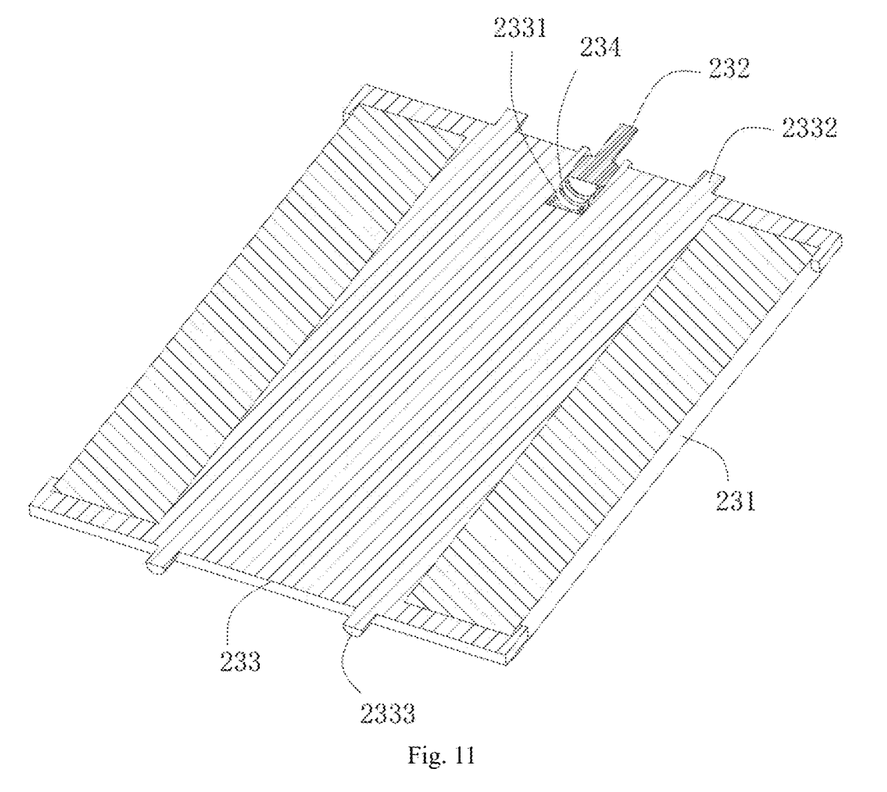
FIG. 11 is a sectional view of the magnet assembly of the present disclosure.
Figure 12:
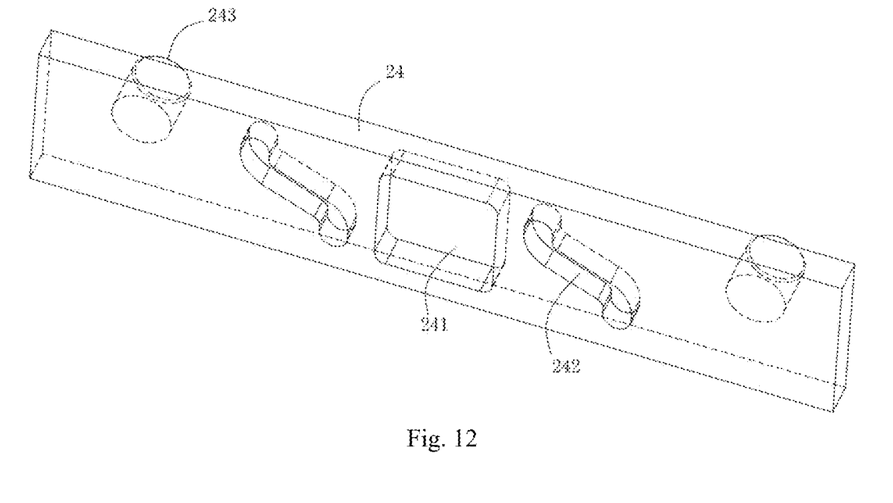
FIG. 12 is a structural schematic view of a guide plate of the present disclosure.

As shown in FIG. 10 and FIG. 11, according to a linear motor for small home appliances of this embodiment, in some embodiments, the magnet assembly 23 includes a magnet slider 233, two magnets 231 are arranged on left and right sides of the magnet slider 233, the magnet slider 233 is provided with an accommodation hole 2331 in a side close to the guide seat 14, a spring 234 is arranged in the accommodation hole 2331, and the bayonet lock 232 is slidably inserted into the accommodation hole 2331 and connected to the spring 234. In this embodiment, by arranging the magnet slider 233, the magnet 231 can be conveniently mounted and fixed. By providing the accommodation hole 2331 in the magnet slider 233, the spring 234 and the bayonet lock 232 can be conveniently mounted. By arranging the spring 234, the bayonet lock 232 can be kept being matched with the switching groove 14a.

As shown in FIG. 6 to FIG. 8 and FIG. 10 to FIG. 12, according to a linear motor for small home appliances of this embodiment, in some embodiments, the magnet support 21 is fixedly provided with a guide plate 24 on a side close to the guide seat 14, the guide plate 24 is provided with an avoidance hole 241 at a position corresponding to the bayonet lock 232, the guide plate 24 is provided with first guide grooves 242 in both sides of the avoidance hole 241, and the first guide groove 242 has a contour shape identical to a contour shape of the second section 142 or the fourth section 144; and the magnet slider 233 is provided with first guide posts 2332 on both sides of the bayonet lock 232, and the first guide posts 2332 are movably embedded in the first guide grooves 242. In this embodiment, by arranging the avoidance hole 241, an avoidance space is provided for the bayonet lock 232 during work, and the bayonet lock 232 is movably embedded in the switching groove 14a after penetrating the avoidance hole 241. In this embodiment, by arranging the first guide groove 242 and the first guide post 2332 matched with each other, the magnet slider 233 is guided and limited during movement, so that the magnet slider 233 is more stable when driving the magnet 231 to move relative to the magnet support 21.

As shown in FIG. 2, FIG. 5, FIG. 7 and FIG. 12, according to a linear motor for small home appliances of this embodiment, in some embodiments, the guide plate 24 is provided with second guide posts 243 at both ends; the guide seat 14 is provided with second guide grooves 149 at both ends; and the second guide posts 243 are movably embedded in the second guide grooves 149. In this embodiment, by providing the second guide post 243 and the second guide groove 149 matched with each other, the magnet support 21 is guided and limited during movement, so that the magnet support 21 is more stable during movement.

As shown in FIG. 7 and FIG. 9 to FIG. 11, according to a linear motor for small home appliances of this embodiment, in some embodiments, an inner wall of the magnet support 21 is provided with two third guide grooves 212 spaced apart, and the third guide groove 212 has a contour shape identical to the contour shape of the second section 142 or the fourth section 144; the magnet slider 233 is provided with two third guide posts 2333 spaced apart on a side close to the open end 11a of the casing 11; and the third guide posts 2333 are movably embedded in the third guide grooves 212. In this embodiment, by arranging the third guide post 2333 and the third guide groove 212 matched with each other, the magnet slider 233 has a more stable movement and higher structural reliability under joint cooperation of the third guide post 2333, the third guide groove 212, the first guide post 2332 and the first guide groove 242.

Figure 1:
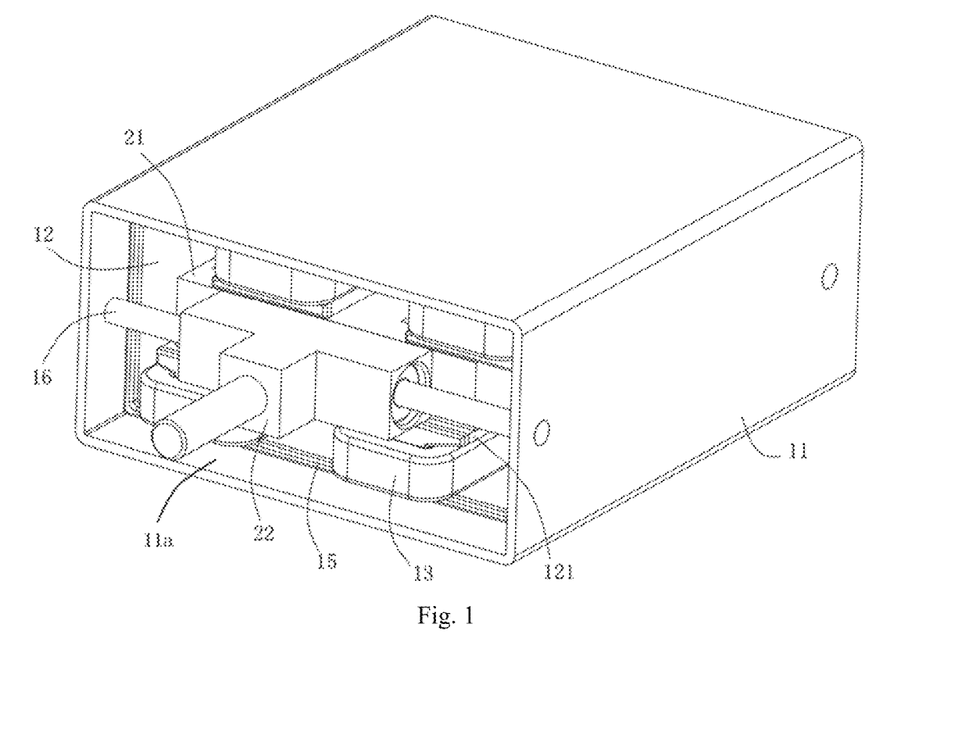
FIG. 1 is a three-dimensional view of the present disclosure.
Figure 2:
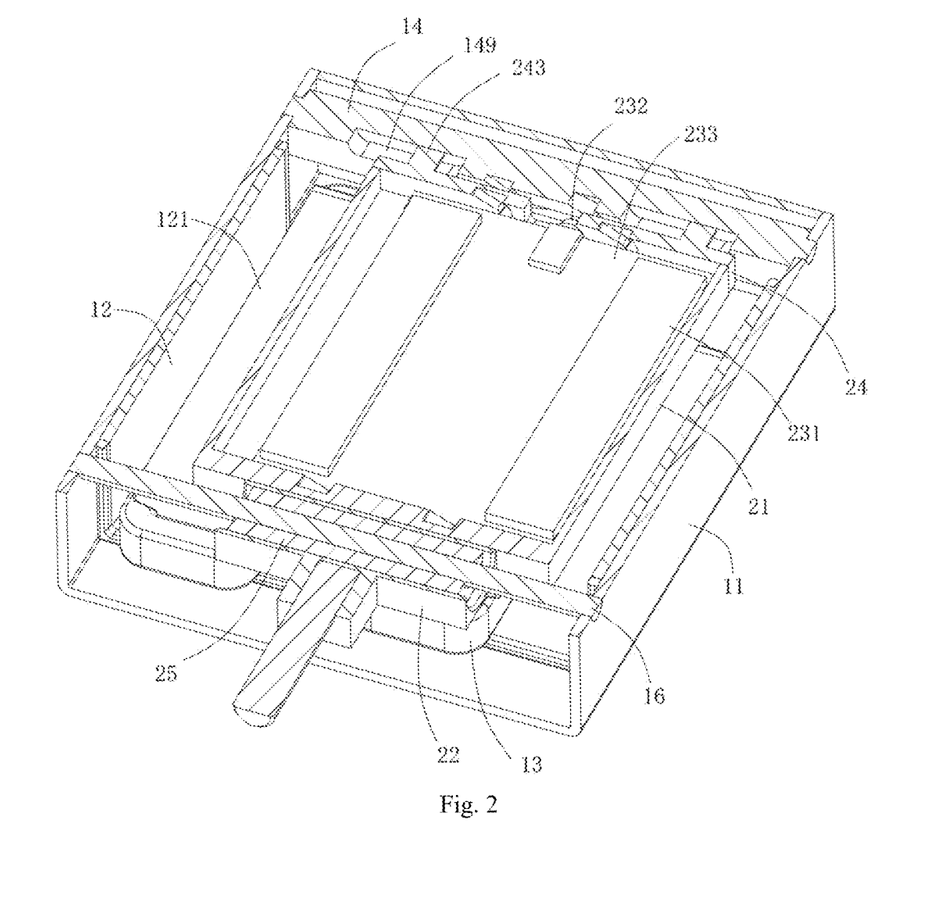
FIG. 2 is a sectional view of the present disclosure.

As shown in FIG. 1 to FIG. 3, according to a linear motor for small home appliances of this embodiment, in some embodiments, both end portions of the iron core 12 are each provided with a winding support 15. Preferably, a shape of the winding support 15 is the same as a shape of a cross section of the iron core 12. In this embodiment, by arranging the winding support 15, the coil winding 13 can be conveniently wound.

As shown in FIG. 1 to FIG. 3, according to a linear motor for small home appliances of this embodiment, in some embodiments, the casing 11 is provided with a guide bar 16 at the open end, and the head portion 22 is slidably arranged on an outer wall of the guide bar 16. In this embodiment, by arranging the guide bar 16, the head portion 22 is guided and limited, so that the magnet support 21 and the head portion 22 move under the joint action of the guide bar 16, the second guide post 243 and the second guide groove 149, and the whole movable portion is higher in movement stability.

As shown in FIG. 2, FIG. 6 and FIG. 8, according to a linear motor for small home appliances of this embodiment, in some embodiments, the head portion 22 is slidably arranged on the guide bar 16 through a linear bearing 25 in a sliding mode. Due to such an arrangement, the guide bar 16 can be conveniently mounted, and the head portion 22 can be moved more stably.

The above is only a preferred embodiment of the present disclosure, so any equivalent changes or modifications made in accordance with the construction, features and principles described in the scope of the patent application of the present disclosure are included in the scope of protection of the patent application of the present disclosure.

What is claimed is:

1. A linear motor for small home appliances, comprising a casing and an iron core, wherein the iron core is arranged in the casing, both upper and lower sides of an inner wall of the iron core are each provided with at least one salient pole, and the salient poles on the upper and lower sides are staggered from each other; a coil winding is wound on the salient pole, a guide seat is arranged at an inner bottom of the casing, a magnet support is slidably arranged in the casing, the magnet support is provided with a head portion at a position close to an open end of the casing, and a magnet assembly is slidably arranged in the magnet support; the magnet assembly is provided with at least one magnet; both upper and lower sides of the magnetic support are each provided with at least one window; and a position of the window corresponds to that of the salient pole;

the guide seat is provided with a switching groove, the magnet assembly is provided with a bayonet lock, the bayonet lock is movably embedded in the switching groove so that when the coil winding is electrified and generates a magnetic field same as that of the magnet, the magnet support drives the magnet assembly and the head portion to slide left and right, and at the same time, the magnet assembly slides up and down with respect to the magnet support, to cause the magnet to be embedded in the corresponding window;

the switching groove comprises a first section, a second section, a third section, and a fourth section connected end to end in sequence; a first step is arranged between the first section and the second section, a second step is arranged between the second section and the third section, and a third step is arranged between the third section and the fourth section; bottom surfaces of the first section, the second section and the fourth section are all inclined surfaces, a depth of an end of the first section close to the fourth section is greater than a depth of an end of the first section close to the second section, a depth of an end of the second section close to the first section is less than a depth of an end of the second section close to the third section, and a depth of an end of the fourth section close to the third section is less than a depth of an end of the fourth section close to the first section; a beveled surface in smooth transition is arranged in the third section; the first section and the third section are both straight slots, and the first section and the third section are parallel to each other; and the second section and the fourth section are both curved slots; and the bayonet lock is elastically arranged on the magnet assembly.

2. The linear motor for small home appliances according to claim 1, wherein both the upper and lower sides of the inner wall of the iron core are each provided with two of the salient poles spaced apart; the magnet assembly is provided with two of the magnets; and both the upper and lower sides of the magnet support are each provided with two of the windows.

3. The linear motor for small home appliances according to claim 1, wherein both end portions of the iron core are each provided with a winding support.

4. The linear motor for small home appliances according to claim 1, wherein the casing is provided with a guide bar at the open end, and the head portion is slidably arranged on an outer wall of the guide bar.

5. The linear motor for small home appliances according to claim 4, wherein the head portion is slidably arranged on the guide bar through a linear bearing in a sleeving mode.

6. The linear motor for small home appliances according to claim 1, wherein the magnet assembly comprises a magnet slider, two of the magnets are arranged on left and right sides of the magnet slider, the magnet slider is provided with an accommodation hole in a side close to the guide seat, a spring is arranged in the accommodation hole, and the bayonet lock is slidably inserted into the accommodation hole and connected to the spring.

7. The linear motor for small home appliances according to claim 6, wherein the magnet support is provided with a guide plate on a side close to the guide seat, the guide plate is provided with an avoidance hole at a position corresponding to the bayonet lock, the guide plate is provided with first guide grooves in both sides of the avoidance hole, and the first guide groove has a contour shape identical to a contour shape of the second section or the fourth section; and the magnet slider is provided with first guide posts on both sides of the bayonet lock, and the first guide posts are movably embedded in the first guide grooves.

8. The linear motor for small home appliances according to claim 7, wherein the guide plate is provided with second guide posts at both ends; the guide seat is provided with second guide grooves at both ends; and the second guide posts are movably embedded in the second guide grooves.

9. The linear motor for small home appliances according to claim 6, wherein an inner wall of the magnet support is provided with two third guide grooves spaced apart, and the third guide groove has a contour shape identical to the contour shape of the second section or the fourth section; the magnet slider is provided with two third guide posts spaced apart on a side close to the open end of the casing; and the third guide posts are movably embedded in the third guide grooves.

* * * * *